United States Patent [19]

Wade et al.

[11] Patent Number: 5,106,571
[45] Date of Patent: Apr. 21, 1992

[54] CONTAINMENT HEAT REMOVAL SYSTEM

[76] Inventors: Gentry E. Wade, 13678 Old Tree Way, Saratoga, Calif. 95070; Giancarlo Barbanti, 20350 Stevens Creek Blvd., Cupertino, Calif. 95014; Perng-Fei Gou, 19606 Via Escuela Dr., Saratoga, Calif. 95070; Atambir S. Rao, 6763 Elmwood Rd., San Jose, Calif. 95120; Li C. Hsu, 13241 Via Grande Ct., Saratoga, Calif. 95070

[21] Appl. No.: 325,729

[22] Filed: Mar. 20, 1989

[51] Int. Cl.[5] .............................. G21C 15/18
[52] U.S. Cl. .................................. 376/283; 376/299
[58] Field of Search ............... 376/283, 298, 299, 282, 376/293

[56] References Cited

U.S. PATENT DOCUMENTS

| | | | |
|---|---|---|---|
| 3,454,466 | 7/1969 | Pitt et al. | 376/283 |
| 3,929,567 | 12/1975 | Schabert et al. | 376/282 |
| 4,050,983 | 9/1977 | Kleimola | 376/283 |
| 4,687,626 | 8/1987 | Tong | 376/298 |
| 4,753,771 | 6/1988 | Conway et al. | 376/282 |

FOREIGN PATENT DOCUMENTS

| | | | |
|---|---|---|---|
| 0004167 | 9/1979 | European Pat. Off. | |
| 62-44687 | 2/1987 | Japan | 376/283 |
| 62-182697 | 8/1987 | Japan | 376/299 |
| 63-33697 | 2/1988 | Japan | 376/283 |
| 63-75691 | 4/1988 | Japan | 376/283 |
| 63-212892 | 9/1988 | Japan | 376/283 |
| 1-19118 | 4/1989 | Japan. | |

OTHER PUBLICATIONS

Nuclear News, Jun. 1986, p. 98.

Primary Examiner—Daniel D. Wasil

[57] ABSTRACT

A gravity driven cooling system pool is disposed at an elevated location with respect to the locations of nuclear fuel rods in a pressure vessel. In the event of a loss of coolant in the pressure vessel, steam pressure is initially reduced by venting the steam into the containment or a closed suppression pool containing a quantity of water under a large air space. The suppression pool condenses sufficient steam to lower the steam pressure in the pressure vessel so that water can flow by gravity from gravity driven cooling system pool to flood the fuel rods in the pressure vessel. An isolation condenser is submerged in a large supply of water elevated with respect to pressure vessel. Steam is admitted to the isolation condenser, or heat exchanger, where it is cooled by boiling the water surrounding it. This steam is vented to the atmosphere. A depressurization valve vents steam fro the pressure vessel into the containment to aid pressure reduction, and thus to aid the gravity flow of coolant. Later, as the pressure in the pressure vessel is reduced by heat removal in the isolation condenser, steam in the containment is permitted to flow from the containment, and into the depressurization valve and thence to the isolation condenser, or heat exchanger.

5 Claims, 1 Drawing Sheet

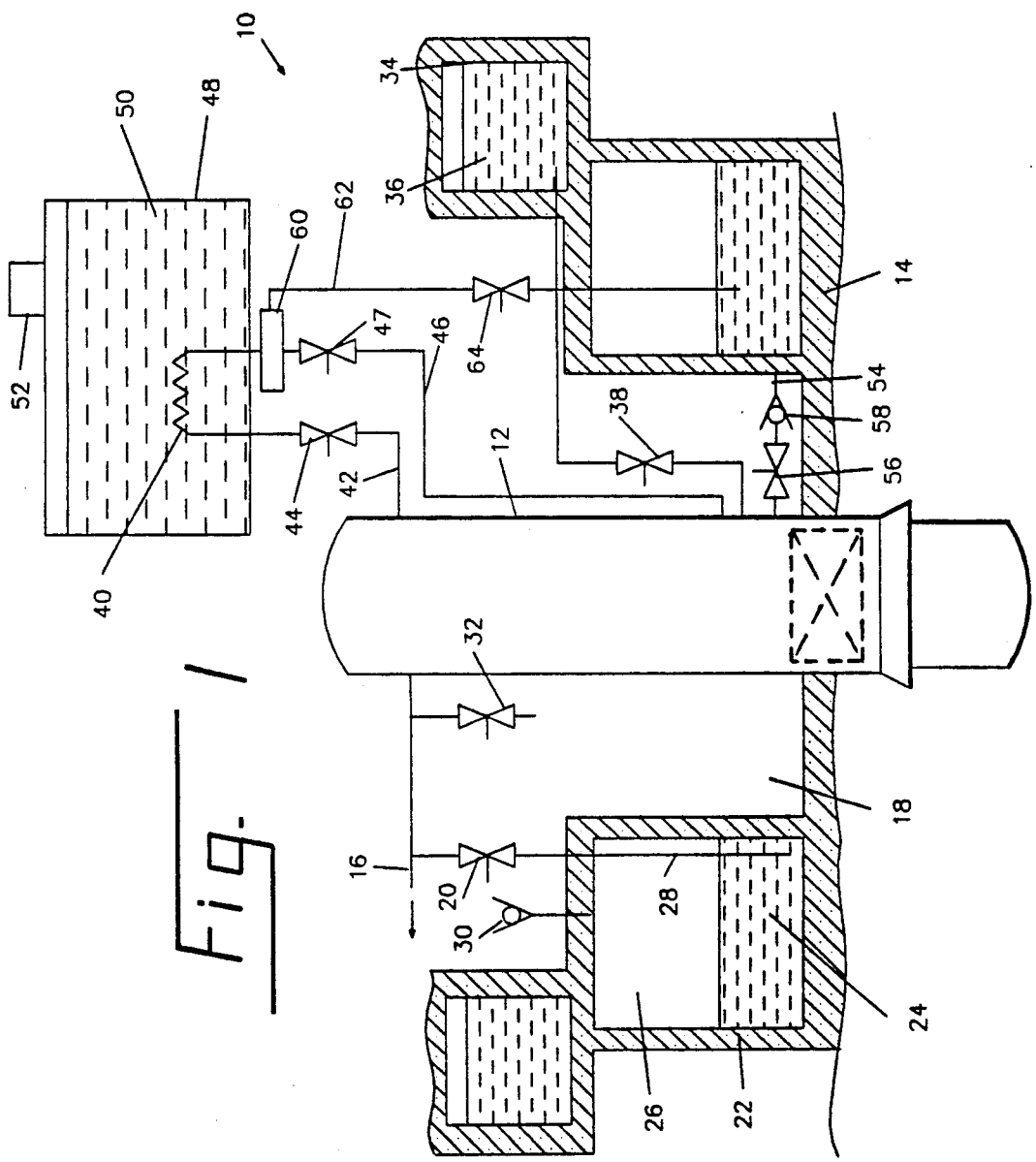

CONTAINMENT HEAT REMOVAL SYSTEM

BACKGROUND OF THE INVENTION

The present invention relates to nuclear reactors and, more specifically, to techniques for cooling nuclear reactors, and their containments, in the event of one or more types of malfunctions.

During normal operation of a nuclear reactor, the nuclear fuel in a reactor vessel remains covered with water to generate steam. The nuclear fuel consists of fuel rods which develop substantial internal heat. After shutdown of the reactor, decay reactions continue to generate heat in the fuel rods for a lengthy period.

It is important to environmental safety to ensure that radioactive materials are not released during normal or abnormal operation. Such radioactive materials include, for example, steam generated in the reactor vessel or water that is condensed from such steam.

Abnormal operations to be discussed in the following disclosure include a loss-of-coolant accident which may occur due to a break in a component or piping such as, for example, a steam pipe within the reactor building. The three requirements in such a situation are 1) to replace water in the reactor pressure vessel to cover the fuel rods, 2) to dissipate the heat existing immediately following the break, and 3) to remove the decay heat over an extended period (days or weeks) following the break, such that structural integrity of the containment vessel is maintained.

In the prior art, the movement of cooling water to satisfy the three foregoing requirements is provided as a result of forced circulation by high-pressure water pumps driven by electricity or other external power source. In the event of failure of the normal electrical grid supplying electric power to the plant, diesel generators are provided to take over the task of supplying power for driving the pumps. It is a fact, however, that there is a small but finite probability, that diesel generators can fail to function at a critical time, or that human errors can incapacitate systems. Such failure following a serious loss of coolant accident such as, for example, a break in a steam pipe, can be considered a worst-case scenario.

An electric generator driven by steam from a nuclear reactor can experience a sudden loss of load for a number of causes. In such a situation, a concomitant reduction in demand for steam occurs at a rate that exceeds the ability of a reactor control system, and the normal power-driven cooling system, to accommodate. In the past, an isolation condenser disposed in a pool of water receives and condenses excess steam until reactor control reduces the production of heat to a value within the capability of the cooling system, or until the generator load is resumed. The pool of water is open to the atmosphere, but the steam and condensate remain in the heat exchanger, isolated from the atmosphere.

The prior art appears innocent of any teaching of the use of an isolation condenser, or similar heat exchanger, as part of a passive system for dissipating heat following a reactor operating transient or an accident.

OBJECTS AND SUMMARY OF THE INVENTION

Accordingly, it is an object of the invention to provide a nuclear reactor system which overcomes the drawbacks of the prior art.

It is a further object of the invention to provide a safe nuclear reactor system that removes decay heat passively.

It is a still further object of the invention to provide a nuclear reactor having a passive cooling system capable of removing initial heat from a reactor vessel and further capable of removing decay heat from the reactor over an extended period following an accident and transferring such heat across the containment boundary for release to the environment.

It is a further object of the invention to provide a nuclear reactor system having a gravity driven cooling system pool disposed at a location providing a gravity head sufficient to feed water to a reactor vessel in a quantity sufficient to cover and cool the reactor core after a loss-of-coolant accident.

It is a still further object of the invention to provide a nuclear reactor system wherein a suppression pool in a containment vessel absorbs an initial high heat load as steam is released into a containment vessel. Water from a gravity driven cooling system flows by gravity to cover and cool the reactor core. An isolation condenser in a cooling pool of water that is open to the atmosphere continues to condense steam and return cooled condensate to the reactor vessel for as long as is necessary to dissipate decay heat from the reactor core. The water in the cooling pool is permitted to boil off to the atmosphere. An initial supply of water in the cooling pool is great enough to ensure that ample time is available for its replenishment. In one embodiment of the invention, the cooling pool is capable of dissipating reactor decay heat for at least 72 hours without replenishment.

Briefly stated, the present invention provides a gravity driven cooling system pool disposed at an elevated location with respect to the locations of nuclear fuel rods in a pressure vessel. In the event of a loss of coolant in the pressure vessel, steam pressure is initially reduced by venting the steam into a closed suppression pool containing a quantity of water under a large air space. The suppression pool condenses sufficient steam to lower the steam pressure in the pressure vessel so that water can flow by gravity from a gravity driven cooling system pool to flood the fuel rods in the pressure vessel. An isolation condenser is submerged in a large supply of water elevated with respect to the pressure vessel. Steam is admitted to the isolation condenser, where it is cooled by boiling the water surrounding it. The resulting steam is vented to the atmosphere. A depressurization valve vents steam from the pressure vessel into the drywell to aid pressure reduction, and thus to aid the gravity flow of coolant. Later, as the pressure in the pressure vessel is reduced by condensation of steam in the isolation condenser, steam in the drywell is permitted to flow from the drywell, and into the depressurization valve and thence to the isolation condenser.

It is a further object of the invention to provide a passive heat removal system based on natural convection and evaporation heat transfer that is capable of removing heat directly from a reactor and indirectly from the containment and discharge the heat across the containment boundary in either isolation transients or loss-of-coolant events. A single system removes heat for plant transients and for transients, instead of the design using two different systems.

It is a still further object of the invention to provide a nuclear reactor system wherein a suppression pool absorbs initial heat energy released from a nuclear reactor into its containment.

During accidents, a passive system, driven by gravity, provides liquid inventory flow into the reactor to keep it covered and cooled.

Depressurization valves are opened following an accident to permit passive heat removal through the isolation condensers by taking suction from both the nuclear reactor and drywell for decay heat removal.

According to an embodiment of the invention, there is provided a nuclear system of a type including a containment having a nuclear reactor therein, comprising: a heat exchanger, a pool of water surrounding the heat exchanger, means for venting the pool of water to the environment outside the containment, means for admitting a heated fluid from within the containment to the heat exchanger, whereby the heated fluid is cooled, and means for returning cooled fluid from the heat exchanger to the containment.

According to a feature of the invention, there is provided a nuclear system of a type including a containment having a nuclear reactor therein, comprising: a pool of coolant, the pool of coolant being disposed at an elevation sufficient to permit a flow of the coolant into the nuclear reactor against a predetermined pressure within the nuclear reactor, and means for reducing a pressure in the nuclear reactor to a value less than the predetermined pressure in the event of a nuclear accident.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a simplified schematic diagram of a nuclear reactor system according to an embodiment of the invention.

DETAILED DESCRIPTION OF THE PREFERRED EMBODIMENT

Referring to FIG. 1, there is shown, generally at 10, relevant portions of a nuclear reactor system in accordance with the invention. A pressure vessel 12 is disposed within a containment building 14 (only part of which is shown. Containment building 14 is conventionally formed of reinforced concrete or structural steel having a strength sufficient to withstand expected values of pressure encountered therein.

As is conventional, pressure vessel 12 contains a quantity of water which is converted to steam, either directly or through an intermediate steam generator, by heat of nuclear fission produced by a plurality of fuel rods (not shown). Modulator vanes (also not shown) are moved in and out of the fuel rods in pressure vessel 12 as necessary to control the production of heat and thus the amount of steam that is generated. Steam exits pressure vessel 12 (or an intermediate steam generator) on one or more main steam lines 16 to a steam turbine-generator (not shown).

A drywell 18 surrounds pressure vessel 12 for containment of liquid and/or steam in case of a rupture of nuclear components such as, for example, pressure vessel 12 or main steam line 16. A safety relief valve 20 is connected from main steam line 16 to a sealed annular suppression pool 22 containing a quantity of water 24. A substantial air space 26 remains free above the surface of water 24 to provide a compressible medium in suppression pool 22, whereby steam can be admitted to suppression pool 22 and additional water condensed from such steam can be accommodated. An outlet tube 28, connected to safety relief valve 20, passes into water 24, whereby the pressure in air space 26 remains lower than the pressure in outlet tube 28 by the amount of hydraulic head produced by the submerged portion of outlet tube 28. A vacuum breaker valve 30 is a check valve permitting outward flow from suppression pool 22 to drywell 18 under certain conditions to be detailed hereinafter. A depressurization valve 32, connected to main steam line 16, opens to drywell 18.

A gravity driven cooling system pool 34 includes a supply of water 36 sufficient to flood pressure vessel 12 to a depth substantially above the upper ends of all fuel rods in pressure vessel 12. A coolant control valve 38 controls flow of the water from gravity driven cooling system pool 34 to pressure vessel 12. Coolant control valve 38 is closed during normal operation.

An equalizing line 54 connects a pool of water, in this case suppression pool 22, to pressure vessel 12. A valve 56 is in equalizing line 54. A check valve 58 is normally closed to prevent water from pressure vessel 12 or water 36 from flowing into suppression pool 22. Valve 56 may be operated at the same time as coolant control valve 38. Equalizing line 54 provides coolant from suppression pool 22 to pressure vessel 12 and keeps the reactor core covered if gravity driven cooling system pool 34 is emptied. The level of water 24 in suppression pool 22 is sufficient to keep the reactor core in pressure vessel 12 covered to the depth required for cooling for an infinite period because any water released from pressure vessel 12 into drywell 18 automatically drains back into water 24 after the lower portions of drywell 18 are flooded.

An isolation condenser 40 is connected near the top of pressure vessel 12 through an isolation line 42 and an isolation valve 44. An isolation return line 46, with an isolation valve 47, is connected from a return, or condensate, side of isolation condenser 40 to a position near the bottom of pressure vessel 12. Isolation condenser 40 is submerged in an isolation pool 48 containing a large quantity of water 50. Isolation pool 48 is open to the atmosphere, as indicated by a stack 52.

During normal operation, safety relief valve 20, depressurization valve 32, coolant control valve 38 and isolation valve 44 or isolation valve 47 are closed. Steam generated in pressure vessel 12 passes through main steam line 16 to steam turbines (not shown). Conventional equipment condenses the used steam and returns it to pressure vessel 12 for reuse. The water and steam in pressure vessel 12 may be radioactive and thus must not be released to the atmosphere during any foreseeable emergency.

In the event of a loss of coolant in pressure vessel 12, or a break in main steam line 16, safety relief valve 20 is opened to permit the flow of existing steam through outlet tube 28 and into water 24 in suppression pool 22. Water 24 is initially at a temperature of about 100 degrees F. As the steam enters water 24 it condenses, thereby lowering the steam pressure in main steam line 16 and pressure vessel 12 and raising the temperature of water 24. While this continues, normal reactor controls are actuated to reduce the amount of heat generated in pressure vessel 12.

By the time the temperature of water 24 is raised to about 120 degrees F, the pressure in pressure vessel 12 has been reduced sufficiently that the pressure head produced by the elevated position of gravity driven cooling system pool 34 is greater than the pressure in pressure vessel 12. Depressurization valve 32 is opened as a further means to vent main steam line 16 into drywell 18, and coolant control valve 38 is opened to permit water 36 from gravity driven cooling system pool 34 to pass into pressure vessel 12, whereby all fuel rods are submerged in water.

Isolation valves 44 and 47 are opened to permit steam to flow from pressure vessel 12 into isolation condenser 40, wherein it is condensed to water, and returned on isolation return line 46 to pressure vessel 12. The heat is transferred from isolation condenser 40 to water 50, which is permitted to boil. Sufficient water 50 is contained in isolation pool 48 to absorb steam generated by decay heat from fuel rods in pressure vessel 12 for about 78 hours without replenishment. Water 50 is isolated from contamination by water and steam inside isolation condenser 40. Thus, water 50 can be replenished as necessary from any normal supply without the complicating problem of water contamination.

A chamber 60 in isolation return line 46 collects condensate which is returned to pressure vessel 12 through isolation return line 46 and isolation valve 47. Chamber 60 also collects any non condensable gasses being discharged from isolation condenser 40 and permits them to be vented through a vent line 62 and a vent valve 64 to suppression pool 22. Venting the non condensable gasses permits continued removal of the reactor decay heat by isolation condenser 40 for all phases of an accident, particularly after cooling of drywell 18 and suppression pool 22 begin. It is also possible to route vent line 62 to other regions of containment building 14, using a fan (not shown) if necessary. Vent valve 64 is normally closed and is only opened when isolation condenser 40 is removing decay heat from containment building 14 after a break in main steam line 16, or similar loss of cooling for pressure vessel 12.

The opening of depressurization valve 32 raises the pressure in drywell 18 to a value about equal to that in pressure vessel 12. As the cooling produced by isolation valves 44 and 46 progresses, the pressure within pressure vessel 12 drops below that in drywell 18. Steam then flows into depressurization valve 32 from drywell 18, and thence to isolation condenser 40 where it condenses.

As the pressure in drywell 18 decreases even further, it eventually, attains a value below that in air space 26. When this difference exceeds the head produced by submergence of outlet tube 28 in water 24, vacuum breaker valve 30 opens to vent air space 26 to drywell 18.

It is foreseen that, in certain installations, the full task of removing heat from containment building 14 may be accomplished using isolation condenser 40. In such an installation, suppression pool 22, and its associated elements, may be omitted.

The foregoing description has used a simplified apparatus in one configuration for convenience of description. For example, a commercial nuclear reactor system may employ two or more main steam lines 16 with appropriate valves and controls. Also, only a single isolation condenser 40 is shown submerged in water 50. It appears preferable to employ more than one isolation condenser 40 submerged in the same, or in different pools of water 50. In the preferred embodiment, four isolation condensers 40 are disposed in a single large isolation pool 48. Any three isolation condensers 40 are capable of absorbing all of the decay heat from nuclear reactor system 10. Thus, if an equipment problem occurs in one isolation condenser 40, the remaining three isolation condensers 40 are capable of completing the job.

A further embodiment, which is considered to fall within the scope of the invention, includes a nuclear reactor that uses nuclear heat to heat water and produce steam in a second loop via a steam generator. This nuclear reactor may use an isolation condenser that initially transfer heat from the reactor liquid to the outside pool without steaming. Following initial depressurization or blowdown following an event, the reactor produces steam that is directed to the isolation condenser using appropriate flow paths which would be well understood by one skilled in the art. Such an embodiment of the invention may exist without the specific containment configuration shown and described in the foregoing.

The term isolation condenser is used herein to describe a heat exchanger that receives a heated fluid such as liquid, steam or a combination thereof, from the nuclear reactor and transfers heat through a set of tubes to a pool of water outside the containment boundary to the atmosphere.

Passive heat removal can be extended indefinitely by increasing the capacity of isolation pool 48, or by condensing steam produced in isolation pool 48 and returning the condensate to water 50.

The invention described herein is applicable to all types of light water cooled nuclear facilities.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A nuclear system of the type including a containment having a nuclear reactor therein, said nuclear reactor including a pressure vessel and a core in said pressure vessel, said system comprising:

a heat exchanger;

a pool of water surrounding said heat exchanger;

means for venting said pool of water to the environment outside said containment;

means for admitting a heated fluid from within said containment to said heat exchanger, whereby said heated fluid is cooled, said means including an isolation line connecting the pressure vessel with an inlet of said heat exchanger; and means for returning cooled fluid from said heat exchanger to said pressure vessel, said means for admitting further including a depressurization valve, said depressurization valve being openable to provide fluid communication from said containment outside said nuclear reactor to said heat exchanger via said pressure vessel and said isolation line.

2. A nuclear system according to claim 1 further comprising a suppression pool, said suppression pool containing a supply of water therein, there being an air-containing headspace in said suppression pool above said supply of water, a check valve for communicating said airspace with said containment, said check valve being operable to vent air in said headspace to said containment when pressure in said headspace exceeds that in said containment, a chamber, said chamber being connected to an outlet side of said heat exchanger, condensate collecting in said chamber incident cooling of said heated fluid, the means for returning cooled fluid being connected to said chamber, and a vent line connected to said chamber and extending therefrom to a vent line terminus submerged in the water supply of said suppression pool, any noncondensible gases separated from the cooled fluid being conveyed through said vent line to the suppression pool.

3. A nuclear system of a type including a containment having a nuclear reactor therein said nuclear reactor including a pressure vessel and a core in said pressure vessel, said system comprising:

a heat exchanger;

a pool of water surrounding said heat exchanger;

means for venting said pool of water to the environment outside said containment;

means for admitting a heated fluid from within said containment to said heat exchanger, whereby said heated fluid is cooled, a fluid flow passing through said heat exchanger being isolated from said pool of water, said means including an isolation line connecting the pressure vessel with an inlet of said heat exchanger, and a depressurization valve for depressurizing said pressure vessel, said depressurization valve when open providing fluid communication from said environment outside said nuclear reactor to said heat exchanger via said pressure vessel and said isolation line;

means for returning cooled fluid from said heat exchanger to said pressure vessel;

a suppression pool in said containment, said suppression pool comprising a supply of water, there being a substantial gas space over said water supply;

means for venting said nuclear reactor into said suppression pool whereby heated fluid from said nuclear reactor is cooled;

a gravity pool of coolant disposed at an elevation sufficient to permit a flow of coolant from said gravity pool into said nuclear reactor pressure vessel against a predetermined pressure within said nuclear reactor pressure vessel; and means for reducing a pressure in said nuclear reactor pressure vessel to a value less than said predetermined pressure in the event of a nuclear accident wherein said means for reducing pressure in said nuclear reactor pressure vessel comprises said nuclear reactor pressure vessel venting means.

4. A nuclear system of a type including a containment having a nuclear reactor therein, said nuclear reactor including a pressure vessel and a core in said pressure vessel, said system comprising:

a gravity pool of coolant disposed at an elevation sufficient to permit a flow of coolant into said nuclear reactor pressure vessel against a predetermined pressure within said nuclear reactor pressure vessel;

means for reducing a pressure of steam in said nuclear reactor pressure vessel to a value less than said predetermined pressure in the event of a nuclear accident, said means including a depressurization valve connected to the pressure vessel, said means further including steam heat dissipating means such dissipating means including a suppression pool;

a supply of water in said suppression pool, there being a headspace in said suppression pool above said water supply;

a substantial amount of air in said head space;

means for feeding pressurized steam from the nuclear reactor pressure vessel to a location under a surface of said supply of water, said supply of water being effective to absorb heat sufficient to reduce steam pressure below said predetermined pressure; and a check valve for communicating said headspace with said containment, said check valve being oriented to vent air in said headspace to said containment when a pressure in said headspace exceeds a pressure in said containment by a predetermined pressure differential.

5. A nuclear system according to claim 4, wherein the pressure in said headspace includes a head produced by feeding steam to said location under said surface of said supply of water.

* * * * *

UNITED STATES PATENT AND TRADEMARK OFFICE
CERTIFICATE OF CORRECTION

PATENT NO. : 5,106,571
DATED : April 21, 1992
INVENTOR(S) : Gentry E. Wade, et al It is certified that error appears in the above-indentified patent and that said Letters Patent is hereby corrected as shown below:

On the title page, insert the following:
--[73] Assignee: GENERAL ELECTRIC COMPANY, San Jose, CA-- and insert before item [57], the following:
--Attorney, Agent, or Firm - Robert R. Schroeder--

Signed and Sealed this

Second Day of November, 1993

Attest:

BRUCE LEHMAN

Attesting Officer

Commissioner of Patents and Trademarks